UNITED STATES PATENT OFFICE.

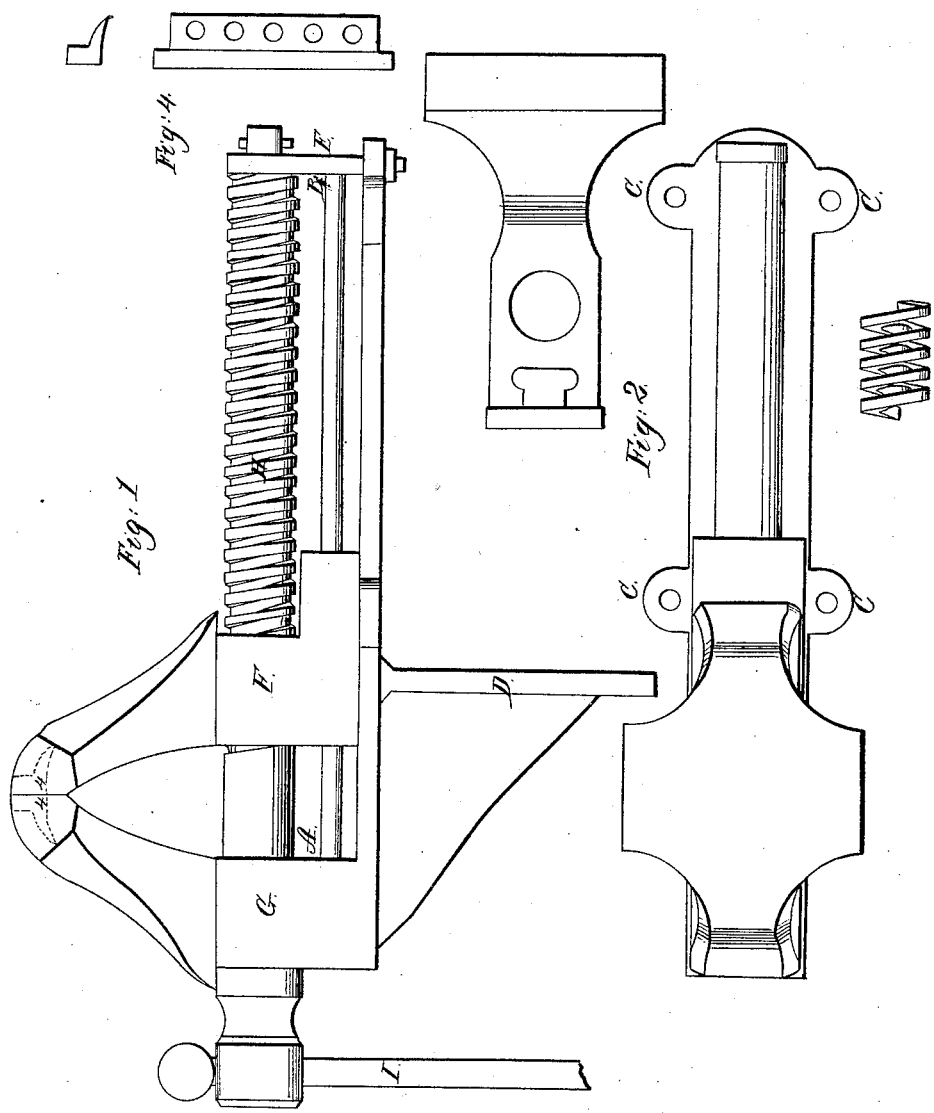

WM. SIM, OF SCHENECTADY, NEW YORK.

MANNER OF MAKING THE JAWS OF VISES.

Specification of Letters Patent No. 2,315, dated October 11, 1841.

*To all whom it may concern:*

Be it known that I, WILLIAM SIM, of the city and county of Schenectady and State of New York, have invented a new and useful Machine or Implement in Mechanics for Use in such Mechanical Branches as Require the Use of a Clamp or Vise, and which I hereby declare that the following is a full, clear, and exact description of the construction and operation of the same and the name of which is the "slide-screw vise," reference being had to the annexed drawings, making a part of this specification, in which—

Figures 1 and 2 are perspective views as the same may be constructed with a single or double slide or foundation, and Fig. 3 elevation of movable or back jaw, and Fig. 4 represents the lip or face of each jaw and is composed of cast steel, having conical holes drilled through it, which holes are largest on the outer or face side and which holes are made for the purpose of admitting the melted iron to pass through the lip in a way that will hold the lip firmly to the jaws. The lip thus constructed is placed in the casting mold where the jaws are to be molded and the melted iron as the mold fills runs through the holes of the lip and by cooling unites the lip firmly to and forms a part of the body of the jaw. Fig. 5 represents a steel thread or worm in the movable jaw (and which is intended to do away with the use of the box of the English vise) so as the screw winds in its thread motion is thereby given to the jaw, and which steel thread or worm is also attached to the jaw by being placed in the casting mold at the same time the jaw is cast and thus united to it in like manner as the lip is united to the jaws.

The nature of my invention consists in a new consideration in which the jaws of the vise are made to move on the slides with great exactness and with a certainty and steadiness of grasp to which is added steel lips in the jaws and a steel thread or worm fixed in the movable jaw making a clamp of great practical advantage over any other description now in use, and particularly by moving the jaws with polished steel faces by means of a screw and also in communicating to the screw a rotary motion simply, it being lodged or resting into uprights which leave the screw free to receive a rotary motion but confine it in such a manner that it cannot be moved endwise in the machine (now the screw in the old vises in opening the vise revolves itself out of the box, but my improvement is contradistinguished in this, to wit: that while it revolves, it does not come out of the clamp, but remains at a fixed point in the machine) and when a rotary motion is given to the screw the movable jaw approaches to or recedes from the stationary jaw along the slide or slides accordingly as the screw is turned either toward the right or left hand, answering all the purposes of a clamp with the most accurate and simple motion. There is also a steel thread or worm placed in the movable jaw substituted in the place of the box heretofore employed in the English vise, and in these particulars excels other vises before used in cheapness of construction, firmness of grip and durability of machine. This "slide screw vise" being composed of the following parts described separately, to wit: The foundation plate consists either of two bar slides united together at the ends as represented in drawing No. 2 or else of one bar slide as represented in drawing No. 1, marked A, B, and there are ears jutting out at the sides of the foundation plate with holes with the view of fastening the plate and machine firmly to the position in which it is to be placed for use, which ears are indicated by the letters C, C, C, C, in draft besides underneath foundation plate and attached thereto is a brace with a hole or holes for the purpose of the more firmly securing the machine in a proper position for use, marked in drawing No. 1 with the letter D, and in the same figure the letter E represents an upright plate fastened to one end of the foundation plate which supports the tail end of the screw. Letter F, in same figure, represents the movable jaw, containing a steel thread or worm fitted therein for the purpose of enabling the screw by being turned to give motion to the movable jaw over and along the slide or slides. The letter G, in same figure, represents the jaw immovably fastened to the foundation plate or slides and in which the head of the screw is made to turn. H represents the screw itself passing through the neck of both jaws and attached at the small end to plate E aforesaid, in which lodgment it turns, having no other than a rotary motion. I represents the handle or lever by which the screw may be turned.

Fig. 5 in draft represents the steel thread or worm placed in the movable jaw, so as to enable the screw by winding in the threads to move the said jaw.

Fig. 4 in draft or drawing represents the steel lip.

This machine may be constructed in the form stated of the following materials, according to the use made of it: Of cast iron, steel or brass.

I herein and hereby disclaim any desire of claiming the invention of the screw or slide in this clamp, as they are familiar mechanical instruments, but I do claim—

The particular manner in which the steel face or lip of the jaws as above described is formed and constructed and the manner of joining the lip thus constructed of steel to the jaws, by casting the lip of steel separately with three or more holes and then placing the steel lip in the mold where the jaw is to be formed and in this manner, as set forth, uniting the lip of steel to the iron jaw, thus forming the jaws of distinct metals and in a simple and durable manner as above described and set forth.

WILLIAM SIM.

Witnesses:
JOHN HOWES,
A. WAGER.